Oct. 26, 1926.                                                    1,604,438
              H. K. WHITEHORN ET AL
             ELECTRIC TRANSMISSION FOR VEHICLES
                   Filed Feb. 3, 1925
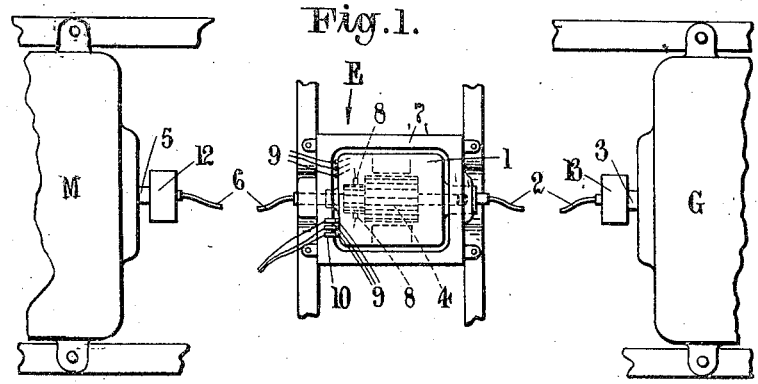
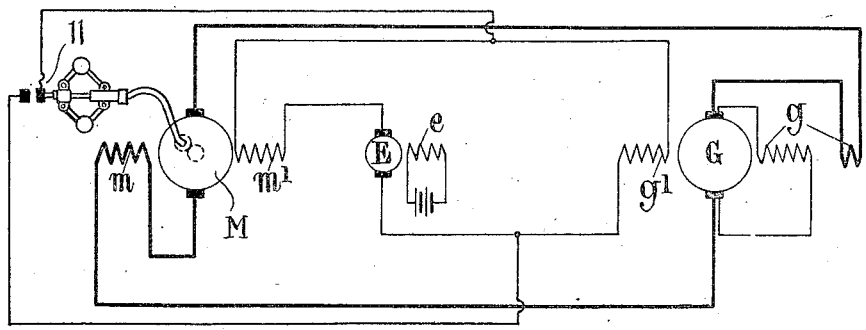

Patented Oct. 26, 1926.

1,604,438

UNITED STATES PATENT OFFICE.

HAROLD KENNETH WHITEHORN AND NORMAN EDWIN KEARLEY, OF MAIDSTONE, ENGLAND, ASSIGNORS TO TILLING-STEVENS MOTORS LIMITED, OF MAIDSTONE, ENGLAND.

ELECTRIC TRANSMISSION FOR VEHICLES.

Application filed February 3, 1925, Serial No. 6,571, and in Great Britain February 6, 1924.

This invention relates to electric transmission systems of the kind in which a generator is driven by a prime mover and supplies current to drive a motor or motors: it is more particularly applicable to vehicles of the type generally known as "petrol-electric" or "gas-electric" wherein an internal combustion engine drives a dynamo which supplies power to a motor or motors driving a Cardan shaft or the wheels of a vehicle direct.

It is an object of the invention to provide an improved system of the kind above referred to, and a further object is to provide an improved arrangement for automatically regulating the field of the generator and/or motor (which terms includes motors) according to the conditions prevailing at any time as to speed and load.

A feature of the invention is the inclusion in such a system of an exciter or auxiliary generator having two rotatable elements (yoke and armature) one of which is driven at a speed depending upon dynamo or engine speed and the other at a speed depending upon motor or road speed; or, from another aspect, the effective speed of the exciter is the relative speed between engine (or dynamo) and motor speeds or some function of these speeds. For convenience the speed of the dynamo and/or engine will be referred to generally as "generating system speed" and that of the motor and/or road wheels or other part driven by the motor as "driven system speed". Other parts of the invention consist in the novel or improved features, combinations and arrangements embodied in the preferred form of apparatus hereinafter described, and illustrated by the accompanying drawings, wherein:—

Fig. 1 is a diagram representing a dynamo, a motor and an exciter with a preferred form of mechanical drive.

Fig. 2 is a wiring diagram showing an arrangement in which the exciter is utilized to influence both generator and motor excitation, the generator being shown for example as a compound wound, and the motor as a series wound machine.

In this form an internal combustion engine drives a dynamo G and free from mechanical driving connection therewith is mounted a motor M which is coupled to the Cardan shaft transmitting the drive from the motor to the road wheels of a vehicle. The yoke 1 of the auxiliary generator E is driven at dynamo speed (for example by a universally jointed or flexible shaft 2) from the dynamo shaft 3; and the armature 4 of the auxiliary generator may be mounted upon an extension of the motor shaft 5 or (as in the diagram), the auxiliay generator E may be independently mounted and its armature 4 driven from the motor shaft 5 by means of a flexible shaft 6.

A proposed construction of the exciter is shown in the drawing in which a stationary frame 7 is shown, within which both the yoke 1 and the armature 4 are free to rotate independently. The brushes 8, 8 rotate with the yoke 1, and the current is conveyed from the machine (and field connections made where necessary) by means of insulated slip rings 9, 9, 9 carried by the yoke, in contact with which are the stationary brushes 10, 10, 10. When the field of the exciter is separately excited, it is obvious that four slip rings are more desirable than the three illustrated, and such is contemplated.

The motor is arranged to run in the same direction as the dynamo for forward running of the vehicle and each is shown with normal field coils $m$ and $g$ respectively. Auxiliary field windings $m'$ and $g'$ are provided to both dynamo and motor and are so connected to the armature circuit of the auxiliary generator that current from the latter tends to weaken the dynamo field and strengthen the motor field so long as the dynamo is running faster than the motor. The exciter armature, may, for example, be connected in series with the auxiliary dynamo and motor field coils $g'$ and $m'$ as shown in the diagram, Fig. 2. The exciter field may be fed from a battery or by current shunted from the main current supplied by the dynamo armature, or it may be self-excited, shunt, series or compounded. As shown at Fig. 2 it is separately excited by a battery and winding 3 as a convenient way of maintaining the field polarity unchanged at all relative speeds of the exciter elements. Should the motor speed at any time exceed that of the dynamo the operation is reversed owing to the reversal of the effective direction of rotation of the exciter and the dynamo field is strengthened and motor field weakened.

It will thus be observed that at starting the engine may be run at any speed up to full speed while the motor is stationary: accordingly the effective speed of the exciter is engine speed and the dynamo field is weakened and the motor field strengthened to the maximum degree, resulting in heavy current and maximum torque for starting. As the motor starts and gains speed the effective speed of the exciter is gradually reduced, until, when the motor is running at engine speed, the exciter is substantially ineffective. As the speed of the vehicle increases further the relative direction of rotation between yoke and armature of the exciter is reversed because the armature speed exceeds that of the yoke. This causes reversal of the exciter current, tending to strengthen the dynamo field and weaken the motor field, so giving the desired condition for high speed running of increased voltage and less current from the dynamo. The normal excitation of dynamo and motor, may, of course, be of any desired type.

A centrifugally operated switch or contact indicated at 11 may be provided to close that portion of the exciter armature circuit feeding the auxiliary coils on the dynamo; this switch is dependent on the motor speed thus causing the influence of the exciter on the dynamo to be inoperative until the vehicle reaches a predetermined speed.

Either unit of the exciter may be driven through a clutch indicated respectively at 12 and 13, Fig. 1, centrifugally operated to slip as a predetermined speed is reached. The engine throttle may be automatically controlled by an electro-magnetic device operated by currents available in the system, for example the main current to the electric motor.

We claim:—

1. In a transmission system of the kind referred to, the combination of an electrical generating system including a generator, a driven system including an electric motor adapted to be supplied with current from said generator, and an exciter, said exciter having two revoluble elements, one of said elements being adapted to be driven at a speed dependent upon that of the generating system and the other at a speed dependent upon that of the driven system.

2. In a transmission system of the kind referred to, the combination of an electrical generating system including an armature and field coils, a driven system including an armature and field coils, and means to generate current to take part in the excitation of said field coils, the effective speed of said means being the difference between a function of generating system speed and a function of driven system speed.

3. In a transmission system of the kind referred to, the combination of a generating system including a generator having armature and field windings, a driven system including a motor having armature and field windings, auxiliary generating means having two revoluble elements, means to drive one of said elements at a speed dependent upon generating system speed, means to drive the other of said elements at a speed dependent upon driven system speed, and connections enabling the current generated by said auxiliary generating means to weaken the generator field during a predetermined range of speeds wherein generating system speed exceeds driven system speed.

4. In a transmission system of the kind referred to, the combination of a generating system including a generator having armature and field windings, a driven system including a motor having armature and field windings, auxiliary generating means having two revoluble elements, means to drive one of said elements at a speed dependent upon generating system speed, means to drive the other of said elements at a speed dependent upon driven system speed, and connections enabling the current generated by said auxiliary generating means to strengthen the motor field during a predetermined range of speeds wherein generating system speed exceeds driven system speed.

5. In a transmission system of the kind referred to, the combination of a generating system including a generator having armature and field windings, a driven system including a motor having armature and field windings, auxiliary generating means having two revoluble elements, means to drive one of said elements at a speed dependent upon generating system speed, means to drive the other of said elements at a speed dependent upon driven system speed, and connections enabling the current generated by said auxiliary generating means to weaken the generator field and strengthen the motor field during a predetermined range of speeds wherein generating system speed exceeds driven system speed.

6. A system as claimed in claim 3, wherein the current generated by the auxiliary generating means is reversed when driven system speed exceeds generating system speed.

7. A system as claimed in claim 4, wherein the current generated by the auxiliary generating means is reversed when driven system speed exceeds generating system speed.

8. A system as claimed in claim 5, wherein the current generated by the auxiliary generating means is reversed when driven system speed exceeds generating system speed.

9. In a transmission system of the kind referred to, the combination of a generator, a motor, an exciter for the generator, connections enabling the exciter current to oppose and weaken the generator field during a predetermined range of speed of the slow running of said motor, and means to render said exciter inoperative upon said field until said predetermined range of speed is entered.

10. The combination claimed in claim 9, said last-named means being centrifugally operated in accordance with the speed of the driven system.

In testimony whereof they affix their signatures.

HAROLD KENNETH WHITEHORN.
NORMAN EDWIN KEARLEY.